United States Patent [19]

Ohnishi et al.

[11] 3,975,285

[45] Aug. 17, 1976

[54] LIQUID CRYSTAL COMPOSITION

[75] Inventors: Yoshitake Ohnishi; Minoru Ozutsumi; Yoshihide Miyazawa; Michihiro Gonda, all of Tokyo, Japan

[73] Assignees: Hodogaya Chemical Co., Ltd.; Nippon Electric Company, Ltd., both of Tokyo, Japan

[22] Filed: Oct. 30, 1973

[21] Appl. No.: 411,297

[30] Foreign Application Priority Data
Oct. 30, 1972  Japan............................ 47-107947
Apr. 25, 1973  Japan............................ 48-47500

[52] U.S. Cl............................. 252/299; 252/408; 350/160 LC
[51] Int. Cl.$^2$...................... G02F 1/13; G02F 1/16; C09K 3/34
[58] Field of Search.................... 252/408 LC, 299; 350/160 LC

[56] References Cited
UNITED STATES PATENTS

| | | | |
|---|---|---|---|
| 3,697,150 | 10/1972 | Wysochi | 252/408 |
| 3,756,694 | 9/1973 | Soree et al. | 252/408 |
| 3,803,050 | 4/1974 | Haas et al. | 252/408 |
| 3,806,229 | 4/1974 | Schoot et al. | 252/408 X |
| 3,806,230 | 4/1974 | Haas et al. | 252/408 |
| 3,814,700 | 6/1974 | Aviran et al. | 252/408 |
| 3,838,059 | 9/1974 | Wong | 252/299 |

OTHER PUBLICATIONS

Baise A.; Teucher, I., Labes, M.; *Appl. Phys. Lett.*, vol. 21, No. 4, pp. 142–143 (Aug. 15, 1972).

*Primary Examiner*—Benjamin R. Padgett
*Assistant Examiner*—T. S. Gron

[57] ABSTRACT

A liquid crystal composition having long-life dynamic light scattering properties under application of DC or AC voltage, comprising (1) at least one liquid crystalline substance selected from the group consisting of nematic and cholesteric, and (2) at least one additive selected from the group consisting of (A) mixtures of at least one first organic cyclic compound selected from the group consisting of quinone compounds, quinoneimine compounds, imino compounds, desoxybenzoin compounds, dibenzyl methane compounds and triphenyl methane compounds, with at least one second organic cyclic compound selected from the group consisting of hydroquinone compounds, aromatic amino compounds, heterocyclic amino compounds and alicyclic amino compounds, and (B) aromatic, heterocyclic and alicyclic compounds having at least one radical selected from the group consisting of carbonyl and imino radicals and at least one radical selected from the group consisting of hydroxyl and amino radicals.

11 Claims, No Drawings

LIQUID CRYSTAL COMPOSITION

The present invention relates to a liquid crystal composition and, more particularly, relates to a liquid crystal composition useful for elctro-optical applications in various industrial field.

Recently, a number of studies of liquid crystals have been carried out in the field of electro-optical displays. As a result, it has been observed that when a DC or AC voltage is applied to a pair of electrodes between which a nematic liquid crystal is sandwiched, the liquid crystal exhibits dynamic scattering of light. Such dynamic scattering of light is utilized for electro-optical displays. In this connection, it had been believed in the past that the dynamic scattering property is inherent in the liquid crystal and, therefore, even if the liquid crystal is highly purified, the resultant pure substance still has the dynamic scattering property. However, this is incorrect. Recently, with the development of purification techniques for liquid crystal highly purified liquid crystal have been subjected to study with regard to their application for electro-optical display. As a result of the studies, it has been found that a highly purified liquid crystal which contains none or a very slight amount of impurities, can not present a dynamic scattering mode under application of voltage. Further, it has been observed that the dynamic scattering phenomenon can be exhibited only by a liquid crystal containing a small amount of conductive impurities. The impurities are, for example, the residue of component compounds, which remained non-reacted in the process of producing the liquid crystal, the residue of solvent used for the recrystallization of the crude liquid crystal, and water absorbed in the liquid crystal.

Generally, most of the liquid crystals are hygroscopic and, therefore, tend to absorb moisture from the atmosphere. Accordingly, a purified liquid crystal having no dynamic scattering property is converted to the liquid crystal having a dynamic scattering property after exposing it to the atmosphere.

However, it is difficult to estimate the kind and amount of the impurities which may be contained in a liquid crystal. Accordingly, it is practically impossible to control the dynamic scattering property of the liquid crystal naturally containing impurities. That is, conventional liquid crystals naturally containing impurities vary in their electro-optical properties and life.

Under these circumstances, it has been proposed to artificially mix a purified liquid crystal with an additive capable of imparting the dynamic scattering property thereto. The proposed additives are generally of the formula:

$(R_1R_2R_3R_4N)^+(X)^-$ wherein $R_1$, $R_2$, $R_3$ and $R_4$ represent an alkyl group, respectively, and X represents a halogen atom. That is, the conventional additives include, for example, dodecyl isoquinolinium bromide (Belgian Pat. No. 713010) and tetramethyl ammonium bromide [Molecular Crystals and Liquid Crystals, Vol. 15, No. 2, P 183 (1971)]. Such conventional additives are added, in an amount of 0.1 to several percent to the purified nematic liquid crystal in order to impart the dynamic scattering property thereto.

However, the conventional additives are ionic and have a relatively short storage life and a relatively short dynamic scattering life under application of DC voltage. That is, under applied DC voltage, the results include coloring and foaming thereof, loss of the dynamic scattering effect and an increase of DC current within several minutes to several tens of hours. These are caused by the ionizing properties of the conventional additives. That is, the conventional additives tend to be electrolyzed under DC voltage. However, under application of AC voltage, a liquid crystal composition containing a conventional additive can maintain its capability for dynamic scattering of light for a fairly long period of time.

An object of the present invention is to provide a liquid crystal composition containing an additive capable of the dynamic scattering effect without deterioration thereof over a long period of time, even under application of DC voltage.

According to the present invention, there is provided a liquid crystal composition having long-life dynamic light scattering properties, comprising (1) at least one liquid crystalline substance selected from the group consisting of nematic and cholesteric, and (2) at least one additive selected from the group consisting of (A) mixtures of at least one first organic cyclic compound selected from the group consisting of quinone compounds, quinoneimine compounds, imino compounds, desoxybenzoin compounds, dibenzyl methane compounds and triphenyl methane compounds, with at least one second organic cyclic compound selected from the group consisting of hydroquinone compounds, aromatic amino compounds, heterocyclic amino compounds and alicyclic amino compounds, and (B) aromatic, heterocyclic and alicyclic compounds having at least one radical selected from the group consisting of carbonyl and imino radicals and at least one radical selected from the group consisting of hydroxyl and amino radicals.

In the liquid crystal compositon of the present invention, the amount of the additive to be mixed with the liquid crystal may be optionally determined in consideration of the kind of the liquid crystal and additive, and purpose of the addition of the additive. Generally, in the liquid crystal composition of the present invention, the additive is preferably present in an amount of 0.01 to 10% by weight, more preferably, 0.05 to 5%, still more preferably, 0.1 to 1.0%.

The liquid crystal usable for the present invention may be selected from one or mixtures of two or more of the following p-alkoxybenzyliene-p-n-alkylanilines wherein the alkoxyl radical in the alkoxybenzylidene group has 1–4 carbon atoms and the n-alkyl radical in the alkyl aniline group has 1–12 carbon atoms cholesteryl halides and cholesteryl esters of organic acids.

The above-mentioned p-alkoxybenzylidene-p-n-alkylaniline may be selected from, for example, p-methoxybenzylidene-p-n-butylaniline, p-ethoxybenzylidene-p-n-butylaniline, p-propoxybenzylidene p-methoxybenzylidene-p-n-hexylaniline and p-methoxybenzylidene-p-n-octylaniline. The cholesteryl halide may be cholesteryl chloride or cholesteryl bromide. The cholesteryl ester of organic acid may be cholesteryl nonanoate and cholesteryl benzoate. It is desirable that the liquid crystal be highly purified to avoid any undesirable influence from the impurities.

The additives usable for the present invention may be selected from mixtures of at least one first organic cyclic compound having at least one radical selected from the group consisting of carbonyl and imino radicals with at least one second organic compound having at least one radical selected from the group consisting of hyroxyl and amino radicals. The first organic cyclic compound may be selected from quinone compounds, quinoneimine compounds, imine compounds, benzophenone compounds, desoxybenzoin compounds, dibenzoyl methane compounds and triphenyl methane compounds.

The quinone compound as stated above may be selected from benzoquinones, naphthoquinones, diphenoquinones, stilbenequinones anthraquinones, phenanthrenequinones, benzoanthraquinones benzophenanthrenequinones, and mixtures of two or more of the above-mentioned compounds. For example, 2-methyl-1,4-benzoquinone, 2,3-dimethyl-1,4-benzoquinone, 2,5-dimethyl- 1,4-benzoquinone, 2,6-dimethyl-1,4-benzoquinone, 2,5-dichloro-1,4-benzoquinone, 2,5-dichlorobenzoquinone, 1,2-, 1,4-, 2,6-naphthoquinone and 1,4,5,8-naphtho-diquinone, 2,6-dimethyl-1,4-naphthoquinone, diphenoquinone, stilbenequinone, 1,2-, 1,4- and 9,10-anthraquinone, 1,2-, 1,4-, 3,4- and 9,10-phenanthrenequinone, 1,2-benzo-3,4anthraquinone, 1,2-benzo-9,10-anthraquinone, 5,6- and 6,12-chrysenquinone, and mixtures of two or more of the above mentioned compounds.

The quinone-imine compounds usable for the present invention may be selected from 6-amino-2-methyl-benzoquinone-(1)-imine-(4) and 2,5-diamino-naphthoquinone-(1)-imine-(4).

The imine compounds usable for the present invention may be 3-amino-1,1-dimethyl-cyclohexene-(3)-imine-(5).

The benzophenone compounds, the desoxybenzoin compounds and the dibenzoyl methane compounds and the triphenyl methane compounds usable for the present invention may be selected from benzophenone, benzoin, dibenzoyl-carbinol, 4-hydroxy-ω-benzoyl-acetophenone, 4-hdyroxybenzoin, 4'-hydroxy-desoxybenzoin and 4',4''-dihydroxyfuchsone.

The second organic compound having at least one radical selected from the group consisting of hydroxyl and amino radicals usable for the present invention may be selected from hydroquinone compounds, which are produced by reducing the above-mentioned quinone compounds, and include hydroquinones, naphthohydroquinones, diphenohydroquinones, stilbenehydroquinones, hydroxyanthraquinones, hydroxyphenanthrenequinones, hydroxybenzoanthraquinones, hydroxybenzophenanthrenequinones, for example, hydroquinone, 2-methyl-hydroquinone-(1,4), pyrocatechol, 2,6-dimethyl-hydroquinone-(1,4), 2,5-dichloro-hydroquinone-(1,4), naphthohydroquinone-(1,4), diphenohydroquinone, naphthohydroquinone-(2,6), stilbenehydroquinone and hydrophenanthrenequinone-(9,10); aromatic amino compounds, for example, 4,4'-diamino-benzophenone, 4'-amino-desoxybenzoin, 2,5-diaminonaphthoquinone-(1,4), 1-aminoanthrone, 4-aminoanthrone, 1,5-diaminoanthraquinone, 5,8-diamino-1,4-dihydroxy-anthraquinone, 2,7-diamino-phenanthrenequinone-(9,10), 1-aminofluoroenone-(9) and 3-amino-benzo[de]-anthrone-(7); heterocyclic amino compounds, for example, 4-aminoanthrapyridone and alicyclic amino compounds, for example, 3-amino-1,1-dimethylcyclohexene-(3)-one-(5) and 3-amino-1,7,7-trimethyl-bicyclo-[2,2,1]-heptanone-(2). The first organic compound may be mixed with the second organic compound in an optional proportion in consideration of the kind of the liquid crystal and the first and second compounds, and purpose of the addition of the additive mixture. Preferably, the first organic compound to be mixed is in the same amount by mol as that of the second organic compound.

The first compound may be combined with the second compound to form a molecular complex.

The additive usable for the liquid crystal composition of the present invention may be selected from aromatic, heterocyclic and alicyclic compounds having at least one radical selected from the group consisting of carboxyl and imino radicals and at least one radical selected from the group consisting of hydroxyl and amino radicals.

The heterocyclic aromatic, and alicyclic compounds having at least one carbonyl radical and at least one hydroxyl radical may be selected from, for example, hydroxycyclopentenone, hydroxycyclohexenone, hydroxybicycloheptanone, hydroxyindanone, hydroxynaphthoquinone, hydroxybenzophenone, hydroxydinaphthoquinone, hydroxydiphenoquinone, benzoin, hydroxyacetophenone, hydroxyanthrone, hydroxyanthraquinone, hydroxyphenanthrenequinone, hydroxyfluorenequinone, hydroxynaphthacenequinone, hydroxybenzanthrone and fuchsone, particularly, the compounds as shown hereinafter in Table 3. In the aromatic, heterocyclic and alicyclic compounds as stated above, the carbonyl radicals may be substituted by an imino radical or the hydroxyl radical may be replaced by an amino radical. Such substituted heterocyclic aromatic and alicyclic compounds may be, for example, aminocyclohexenoneimine, aminobicycloheptanone, aminonaphthoquinone, naphthoquinoneimine, benzoquinoneimine, aminobenzophenone, aminoanthrone, aminoanthraquinone, aminohydroxyanthraquinone, aminophenanthrenequinone, aminofluorenone, aminonaphthacenequinone, aminobenzanthrone aminofuchsone, naphthopyridone, anthrapyridone, acridone, phenazine, phenothiazine, phenooxazine and carbazole, particularly, the compounds as shown in hereinafter Table 3.

The amino compounds as mentioned above may have one or more of hydroxyl radical. Also, the heterocyclic compounds as stated above may have one or more of hydroxyl and amino radicals.

The above-stated additives of the present invention are soluble in the liquid crystal at room temperature. Accordingly, the liquid crystal composition of the present invention is prepared by uniformly dissolving the additive in the liquid crystal. Such liquid crystal composition has a capability of presenting the dynamic scattering effect for light. That is, when the liquid crystal composition is put between a pair of electrodes and subjected to impression with a DC or AC voltage, the liquid crystal composition displays dynamic scattering of light. Such dynamic scattering property can be maintained over a period longer than 10,000 hours without decomposition of the composition even under application of a DC voltage. Further, it should be noted that the liquid crystal composition of the present invention can be kept over a very long period without deterioration of the additive and change in the dynamic scattering property thereof.

The features and advantages of the liquid crystal composition are further illustrated by the following examples which are not intended to limit the scope of the present invention.

EXAMPLE 1

A liquid crystal composition was prepared by uniformly dissolving an additive consisting of 0.37% by weight of p-benzoquinone and 0.37% by weight of hydroquinone in 99.26% by weight of a pure p-methoxybenzylidene-p-n-butylaniline which is in the state of a nematic liquid crystal at room temperature.

The liquid crystal composition thus prepared was put between a pair of clear electrodes made of tinoxide and spaced at 20 microns from each other. When a DC voltage of 30 volts was applied between the electrodes, the liquid crystal composition exhibited dynamic scattering of light which was firmly maintained over a period longer than 8,000 hours under the intermittent application of DC voltage without decomposition of the above-mentioned composition.

Also, an AC voltage of 30 volts at a frequency of 50 Hertz was applied between the above-mentioned electrodes, and the liquid crystal composition again displayed the dynamic scattering of light.

The dynamic scattering was maintained over a period longer than 10,000 hours under application of DC voltage of 18 volts.

For comparison, 99.25% by weight of the pure p-methoxybenzylidene-p-n-butylaniline was mixed with 0.75% by weight of p-benzoquinone (Comparison Example 1) and, separately, with 0.75% by weight of hdyroquinone (Comparison Example 2).

The same DC and AC voltages as stated above were applied to the liquid crystal compositions of Comparison Examples 1 and 2. No dynamic scattering of light was shown by the compositions of Comparison Examples 1 and 2.

EXAMPLE 2

A liquid crystal composition was prepared by dissolving an additive consisting of quinhydrone which is a molecular complex of p-benzoquinone with hydroquinone, in 99.35% by weight of p-methoxybenzylidene-p-n-butylaniline. The same impression procedures as stated in Example 1 were repeated using the above-prepared liquid crystal composition. The liquid crystal composition showed a remarkable dynamic scattering of light and had a high stability for a long storage time.

EXAMPLE 3

The same procedures as in Example 1 were repeated using a liquid crystal composition consisting of 0.60% by weight of 1,4-nahthoquinone, 0.42% by weight of hydroquinone and the balance consisting of p-methoxybenzylidene-p-n-butylaniline. The liquid crystal composition showed a noticeable dynamic scattering of light.

EXAMPLE 4

The same procedures as in Example 1 were repeated using a liquid crystal composition consisting of 0.68% by weight of 9,10-anthraquinone, 0.36% by weight of hdyroquinone and the balance consisting of p-benzylidene-p-n-butylaniline. The DC voltage impression resulted in a remarkable scattering of light.

EXAMPLES 5 through 37

34 Liquid crystal compositions were prepared from 100 parts by weight of p-methoxybenzylidene-p-n-butylaniline and an additive selected from 34 mixtures mentioned in Table 1.

Table 1

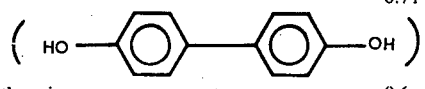

| Ex. No. | Component | Amount (part by weight) |
|---|---|---|
| 5 | 2-Methyl-1,4-benzoquinone | 0.69 |
|   | 2-Methyl-1,4-hydroquinone | 0.70 |
| 6 | 2,3-Dimethyl-1,4-benzoquinone | 0.75 |
|   | Hydroquinone | 0.44 |
| 7 | 2,3-Dimethyl-1,4-benzoquinone | 0.75 |
|   | Brenzcatechol | 0.44 |
| 8 | 2,5-Dimethyl-1,4-benzoquinone | 0.75 |
|   | Hydroquinone | 0.44 |
| 9 | 2,6-Dimethyl-1,4-benzoquinone | 0.75 |
|   | Hydroquinone | 0.44 |
| 10 | 2,6-Dimethyl-1,4-benzoquinone | 0.75 |
|   | Pyrocatechol | 0.44 |
| 11 | 2,6-Dimethyl-1,4-benzoquinone | 0.75 |
|   | 2,6-Dimethyl-1,4-hydroquinone | 0.75 |
| 12 | 2,5-Dichloro-1,4-benzoquinone | 0.53 |
|   | Hydroquinone | 0.34 |
| 13 | 2,5-Dichloro-1,4-benzoquinone | 0.53 |
|   | 2,5-Dichloro-1,4-hydroquinone | 0.53 |
| 14 | 1,2-Naphthoquinone | 0.6 |
|   | Hydroquinone | 0.42 |
| 15 | 1,4-Naphthoquinone | 0.6 |
|   | 1,4-Naphthohydroquinone | 0.6 |
| 16 | 1,4-Naphthoquione | 0.6 |
|   | Diphenol | 0.71 |
| 17 | 2,6-Naphthoquinone | 0.6 |
|   | Hydroquinone | 0.42 |
| 18 | 2,6-Naphthoquinone | 0.63 |
|   | 2,6-Naphthoquinone | 0.64 |
| 19 | 2,6-Dimethyl-1,4-naphthoquinone | 0.80 |
|   | Hydroquinone | 0.37 |
| 20 | 1,4,5,8-Naphthoquinone | 0.39 |
|   | Hydroquinone | 0.44 |
| 21 | 1,4,5,8-Naphthoquinone | 0.39 |
|   | 2,6-Naphthohydroquinone | 0.64 |
| 22 | Diphenoquinone | 0.63 |
|   | Hydroquinone | 0.38 |
| 23 | Diphenoquinone | 0.63 |
|   | Diphenol | 0.63 |
| 24 | Stilbenequinone | 0.72 |
|   | Hydroquinone | 0.37 |
| 25 | Stilbenequinone | 0.72 |
|   | 4,4'-Dioxystilbene | 0.72 |
| 26 | 1,2-Anthraquinone | 0.68 |
|   | Hydroquinone | 0.4 |
| 27 | 1,4-Anthraquinone | 0.68 |
|   | Hydroquinone | 0.4 |
| 28 | 9,10-Anthraquinone | 0.68 |
|   | 2,6-Naphthohydroquinone | 0.53 |
| 29 | 1,2-Phenanthrenequinone | 0.68 |
|   | Hydroquinone | 0.4 |
| 30 | 1,4-Phenonthrenequinone | 0.68 |
|   | Hydroquinone | 0.4 |
| 31 | 3,4-Phenanthrenequinone | 0.68 |
|   | Hydroquinone | 0.4 |
| 32 | 9,10-Phenanthrenequinone | 0.68 |
|   | Hydroquinone | 0.4 |
| 33 | 9,10-Phenanthrenequinone | 0.68 |
|   | 9,10-Hydrophenanthrenequinone | 0.68 |
| 34 | 1,2-Benzo-3,4-anthraquinone | 0.85 |
|   | Hydroquinone | 0.37 |
| 35 | 1,2-Benzo-9,10-anthraquinone | 0.85 |
|   | Hydroquinone | 0.37 |
| 36 | 5,6-Chrysoquinone | 0.85 |
|   | Hydroquinone | 0.37 |
| 37 | 6,12-Chrysoquinone | 0.85 |
|   | Hydroquinone | 0.37 |

All the above-mentioned liquid crystal compositions exhibited dynamic scattering of light when AC and DC voltages were applied in the same manner as in Example 1.

Examples 38 through 41

Four liquid crystal compositions were prepared by dissolving one of additives shown in Table 2 in a two-component nematic liquid crystal consisting of 1 mol of p-methoxybenzylidene-p-n-butylaniline and 1 mol of p-ethoxybenzylidene-p-n-butylaniline.

Table 2

| Example No. | Composition of Additive | |
|---|---|---|
| | Component | Amount (part by weight) |
| 38, 42, 46, 50 | p-Benzoquinone Hydroquinone | 0.37 0.37 |
| 40, 44, 48, 52 | 1,4-Naphthoquinone Hydroquinone | 0.60 0.42 |
| 41, 45 | 9,10-Anthraquinone | 0.68 |
| 49, 53 | Hydroquinone | 0.36 |

The liquid crystal compositions had the same dynamic scattering property of light as that in Example 1.

EXAMPLES 42 through 45

The same procedures as in Examples 38 through 41 were repeated using a three-component nematic liquid crystal consisting of 1 mol of p-methoxybenzylidene-p-n-octylaniline, 1 mol of p-propoxybenzylidene-p-n-octylaniline and 1 mol of p-methoxybenzylidene-p-n-hexylaniline instead of the two-component liquid crystal.

All the liquid crystal compositions had the same dynamic scattering property of light as in Example 1.

EXAMPLES 46 through 49

A five-component nematic liquid crystal was prepared by mixing 95% by weight of a blend of 1 mol of p-methoxybenzylidene-p-n-butylaniline, 1 mol of p-methoxybenzylidene 1 mol of propoxybenzylidene-p-n-octylaniline and 1 mol of p-methoxybenzylidene-p-n-hexylaniline with 5% by weight of cholesteryl chloride. The same procedures as in Examples 38 through 41 were repeated using the above-menioned five-component nematic liquid crystal instead of the two-component liquid crystal. All the liquid crystal compositions had the same dynamic scattering property as in Example 1. It was noted that even after the applied voltage was removed, the liquid crystal composition kept the scattering of light over a period longer than several tens of minutes. This phenomenon is called a memory effect of the liquid crystal composition.

EXAMPLE 50 through 53

The same procedures as in Examples 50 through 53 were repeated by using cholesteryl nonanoate instead of the cholesteryl choride.

All the resultant liquid crystal compositions had the same dynamic scattering property as in Example 1.

From the results in Examples 1 through 53, it is obvious that the additive mixture effective to impart the dynamic light scattering effect to the simple component nematic liquid crystals are also effective for the multi-component nematic liquid crystals.

EXAMPLE 54

A liquid crystal composition was prepared by uniformly dissolving 1.0% by weight of 1,5-dihydroxyanthraquinone-(9,10) of the formula:

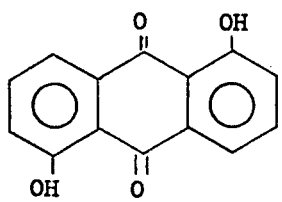

in 99.0% by weight of p-methoxybenzylidene-p-n-butylaniline. The liquid crystal composition was put between a pair of clear electrodes facing each other at a distance of 20 microns. When a DC voltage of 25 volts was applied between the electrodes, the liquid crystal composition offered remarkable dynamic scattering of light which was firmly maintained constant during the application. When the application of DC voltage was stopped, the dynamic scattering of light immediately disappeared. The same dynamic scattering of light as stated above was present when an AC voltage of 30 volts at 50 Hertz was applied to the electrodes.

The p-methoxybenzylidene-p-n-butylaniline itself did not have the capability of presenting the dynamic scattering of light even when applied by a DC or AC voltage of 30 volts.

EXAMPLE 55

The same procedures as in Example 54 were repeated using 0.1% by weight of 5,6,9,10-tetrahydroxyanthraquinone-(1,4) of the formula:

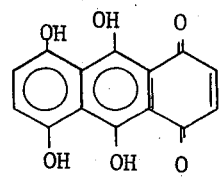

Even although the amount of the 5,6,9,10-tetrahyroxyanthraquinone-(1,4) was one tenth that of 1,5-dihydroxyanthraquinone-(9,10) in Example 55, the resulting liquid crystal composition could offer remarkable dynamic scattering of light at the same DC and AC voltage impressions as in Example 54.

EXAMPLE 56

The same procedure as in Example 54 were repeated using a two-component nematic liquid crystal consisting of 1 mol of p-ethoxybenzylidene-p-n-butylaniline and 1 mol of p-methoxybenzylidene-p-n-butylaniline. The resultant composition presented the same dynamic scattering of light as in Example 54.

EXAMPLE 57

The same procedures as in Example 55 were repeated using a two-component nematic liquid crystal consisting of 1 mol of p-methoxybenzylidene-p-n-butylaniline and 1 mol of p-ethoxybenzylidene-p-n-butylaniline. The resultant composition presented the same dynamic scattering of light as in Example 56.

EXAMPLE 58

The same procedures as in Example 54 were repeated using a three-component nematic liquid crystal consisting of equal amounts by mol of p-methoxybenzylidene-p-n-octylaniline, p-propoxybenzylidene-p-n-octylaniline and p-methoxybenzylidene-p-n-hexylaniline. The resultant composition had the same dynamic light scattering property as in Example 54.

EXAMPLE 59

The same procedures as in Example 55 were repeated using the same three-component nematic liquid crystal as in Example 58. The resulting composition

EXAMPLE 60

The same procedures as in Example 54 were repeated using a nematic liquid crystal consisting of 95% by weight of the same two-component liquid crystal as in Example 56 and 5% by weight of cholesteryl nonanoate. The resultant liquid crystal composition offered the same dynamic light scattering as in Example 54 when a DC or AC voltage was applied to a pair of clear electrodes between which the liquid crystal composition was sandwiched. It was noted that even after the applied voltage was removed, the liquid crystal composition kept the dynamic scattering of light over a period longer than several tens minutes.

had the same dynamic light scattering property as in Example 55.

EXAMPLE 61

The same procedures as in Example 55 were repeated except that the nematic liquid crystal consisted of 95% by weight of the same three-component liquid crystal as in Example 58 and 5% by weight of cholesteryl nonanoate. The resultant liquid crystal composition had the same dynamic light scattering effect and memory effect as those of the composition of Example 60.

EXAMPLES 62 through 105

44 liquid crystal composition were prepared from the components in the proportions as shown in Table 3. In this table, the abbreviation "MBBA" stands for —p-methoxybenzylidene-p-n-butylaniline—, "EBBA" for —p-ethoxybenzylidene-p-n-butylaniline—, "PBOA" for —p-propoxybenzylidene-p-n-octylaniline—, "MBHA" for —p-methoxybenzylidene-p-n-hexylaniline— and "CN" for —cholesteryl nonanoate—.

Table 3

| | Nematic liquid crystal | | Liquid Crystal Composition Additive | |
|---|---|---|---|---|
| Example No. | Component | Mixing ratio by mol | Compound (Formula) | Amount in % based on the weight of composition |
| 62 | MBBA | — | 1-Hydroxy-cyclopentene-(1)-one-(5) 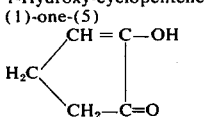 | 1.0 |
| 63 | " | — | 1-Hydroxy-cyclohexene-(1)-one-(3) 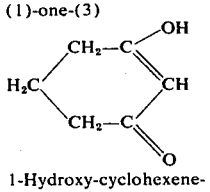 | 1.0 |
| 64 | " | — | 1-Hydroxy-cyclohexene-(1)-one-(4) 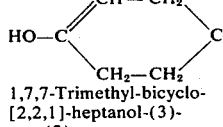 | 1.0 |
| 65 | " | — | 1,7,7-Trimethyl-bicyclo-[2,2,1]-heptanol-(3)-one-(2) 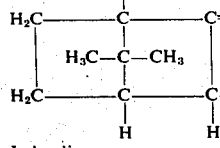 | 1.5 |
| 66 | " | — | Indandione 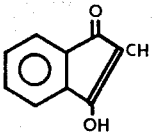 | 1.0 |
| 67 | " | — | 4-Hydroxynaphtho-quinone-(1,2) | 1.0 |

Table 3-continued

| Example No. | Nematic liquid crystal Component | Mixing ratio by mol | Compound (Formula) | Amount in % based on the weight of composition |
|---|---|---|---|---|
| 68 | MBBA and EBBA | 1:1 | 6-Hydroxynaphtho-quinone-(1,4) | 1.0 |
| 69 | " | " | 4-[3,4-Dihydroxy-naphthyl-(1)]-naphthoquinone-(1,2) | 1.0 |
| 70 | " | " | 4,4'-Dihydroxy-benzophenone | 1.0 |
| 71 | " | " | 2,3,4-Trihydroxy-benzophenone | 1.0 |
| 72 | " | " | 3-[2',5'-Dihydroxy-phenyl]-benzoquinone-(1,4) | 1.0 |
| 73 | " | " | Benzoin | 1.0 |

Curcumin

Table 3-continued

Liquid Crystal Composition

| Example No. | Nematic liquid crystal Component | Mixing ratio by mol | Additive Compound (Formula) | Amount in % based on the weight of composition |
|---|---|---|---|---|
| 74 | " | " | (structure with H₃CO, HO, CH=CH-C(=O)-CH₂-C(=O)-CH=) <br> 4-Hydroxybenzoin | 1.0 |
| 75 | MBBA, PBOA and MBHA | 1:1:1 | (structure) Dibenzoyl carbinol | 1.0 |
| 76 | " | " | (structure) 4-Hydroxy-ω-benzoyl-acetophenone | 1.0 |
| 77 | " | " | (structure) 1,4-Dihydroxyanthrone-(9) | 1.0 |
| 78 | " | " | (structure) 2,6-Dihydroxyanthrone-(9) | 1.0 |
| 79 | " | " | (structure) 2-Hydroxyanthraquinone-(9,10) | 1.0 |
| 80 | " | " | (structure) 1,4-Dihydroxy-anthraquinone-(9,10) | 1.0 |

Table 3-continued

| Example No. | Nematic liquid crystal Component | Mixing ratio by mol | Additive Compound (Formula) | Amount in % based on the weight of composition |
|---|---|---|---|---|
| 81 | MBBA CN | 95% 5% (by weight) | 1,2,5,6-Tetrahydroxy-anthraquinone-(9,10) | 1.0 |
| 82 | '' | '' | 7-Hydroxyphenanthrene-quinone-(9,10) | 0.2 |
| 83 | MBBA, EBBA and CN | 47.5% 47.5% 5.0% (by weight) | 6-Hydroxy-7,8-benzo-fluorenone-(9) | 1.0 |
| 84 | '' | '' | 2,6-Dihydroxynaphtha-cenequinone-(5,12) | 1.0 |
| 85 | '' | '' | 5,6-Dihydroxy-benzo[de]-anthrone-(7) | 1.0 |
| 86 | '' | '' | 3-Amino-1,1-dimethyl-cyclohexene-(3)-one-(5) | 1.0 |

Table 3-continued

| | Liquid Crystal Composition | | | |
|---|---|---|---|---|
| | Nematic liquid crystal | | Additive | |
| Example No. | Component | Mixing ratio by mol | Compound (Formula) | Amount in % based on the weight of composition |
| 87 | MBBA | — | 3-Amino-1,1-dimethyl-cyclohexene-(3)-imine-(5) | 1.0 |
| 88 | " | — | 3-Amino-1,7,7-trimethyl-bycyclo-[2,2,1]-heptanone-(2) | 1.0 |
| 89 | " | — | 2,5-Diaminonaphtho-quinone-(1,4) | |
| 90 | " | — | 2,5-Diaminonaphtho-quinone-(1)-imine-(4) | 0.5 |
| 91 | " | — | 6-Amino-2-methyl-benzo-quinone-(1)-imine-(4) | 0.5 |
| 92 | MBBA, and EBBA | 1:1 | 4'-Amino-desoxybenzoin | 1.0 |
| 93 | " | " | | 1.0 |

Table 3-continued

| Example No. | Nematic liquid crystal Component | Mixing ratio by mol | Additive Compound (Formula) | Amount in % based on the weight of composition |
|---|---|---|---|---|
| 94 | '' | '' | 4,4'-Diaminobenzophenone 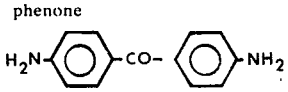 | 1.0 |
| 95 | '' | '' | 1-Aminoanthrone 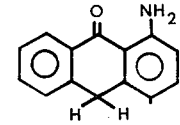 | 1.0 |
| 96 | '' | '' | 4-Aminoanthrone 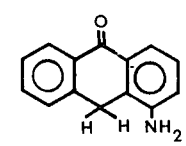 | 1.0 |
| 97 | MBBA and PBOA | '' | 1,5-Diaminoanthraquinone 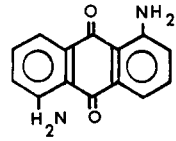 | 1.0 |
| 98 | '' | '' | 5,8-Diamino-1,4-dihydroxyanthraquinone 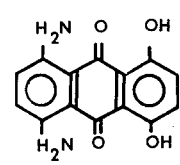 | 0.2 |
| 99 | '' | '' | 2,7-Diaminophenanthrenequinone(9,10) 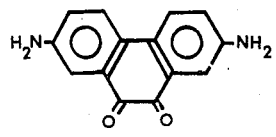 | 1.0 |
| 100 | '' | '' | 1-Aminofluorenone-(9) 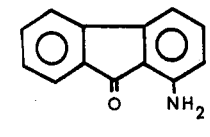 | 1.0 |
| | | | 3-Amino-benzo[de]-anthrone-(7) | |

Table 3-continued

| Example No. | Nematic liquid crystal Component | Mixing ratio by mol | Liquid Crystal Composition Additive Compound (Formula) | Amount in % based on the weight of composition |
|---|---|---|---|---|
| 101 | " | " | 1,3-Dihydroxyacridone-(10) | 1.0 |
| 102 | " | " | 4-Hydroxyanthrapyridone | 1.0 |
| 103 | MBBA CN | 95% 5% (by weight) | 4-Aminoanthrapyridone | 1.0 |
| 104 | " | " | 4',4''-Dihydroxyfuchsone | 1.0 |
| 105 | " | " |  | 1.0 |

In Table 3, the liquid crystal compositions of Examples 82 and 98 had a high dynamic light scattering effect in spite of the small amount of 0.2% by weight of the additives. The liquid crystal compositions of Examples 24 through 29 and 103 to 105 which contained cholesteryl nonanoate, had a high memory effect.

From the results in Examples 54 through 105, it is evident that the additives effective for imparting the dynamic scattering effect to the simple component nematic liquid crystals are also effective for the multi-component nematic liquid crystals.

What we claim is:

1. A liquid crystal composition having long-life dynamic light scattering properties under application of AC or DC voltage, comprising (1) at least one nematic liquid crystal or mixture thereof with at least one cholesteric liquid crystal, and (2) at least one additive selected from the group consisting of (A) mixtures of at least one first organic cyclic compound selected from the group consisting of naphthoquinone, diphenoquinone, stilbenequinone, anthraquinone, phenanthrenequinone, benzoanthraquinone, benzophenanthrenequinone, quinoneimine compounds, organocyclic imino compounds, benzophenone compounds, desoxybenzoin compounds, dibenzyl methane compounds and triphenyl methane compounds, with at least one second organic cyclic compound selected from the group consisting of naphthohydroquinones, diphenohydroquinones, stilbenehydroquinones, hydroxyanthraquinones, hydroxyphenanthrenequinones, hydroxybenzoanthraquinones and hydroxybenzophenanthrenequinones, aromatic amino compounds, heterocyclic amino compounds and alicyclic amino compounds, and (B) third organic cyclic compounds selected from the group consisting of hydroxycyclopentenone, hydroxycyclohexenone, hydroxybicycloheptanone, hydroxyindanone, hydroxynaphthoquinone, hydroxybenzophenone, hydroxydinaphthoquinone, hydroxydiphenoquinone, benzoin, hydroxyacetophenone, hydroxyanthrone, hydroxyanthraquinone, hydroxyphenanthrenequinone, hydroxyfluorenequinone, hydroxynaphthacenquinone, hydroxybenzanthrone, fuchsone, aminocyclohexenoneimine, aminobicycloheptanone, aminonaphthoquinone, naphthoquinoneimine, benzoquinoneimine, aminobenzophenone, aminoanthrone, aminoanthraquinone, aminohydroxyanthraquinone, aminophenanthrenequinone, aminofluorenone, aminonaphthacenquinone, aminobenzanthrone, aminofuchsone, naphthopyridone, anthrapyridone, acridone, phenazine, phenothiazine, phenooxazine and carbazole.

2. A liquid crystal composition as claimed in claim 1, wherein said additive is present in an amount of 0.01 to 10% by weight.

3. A liquid crystal composition as claimed in claim 2, wherein said amount of said additive is from 0.05 to 5% by weight.

4. A liquid crystal composition as claimed in claim 3, wherein said amount of said additive is from 0.1 to 1.0% by weight.

5. A liquid crystal composition as claimed in claim 1, wherein said nematic liquid crystal is selected from the group consisting of p-alkoxybenzylidene-p-n-alkylanilines in which the alkoxyl radical in the alkoxybenzylidene group has 1–4 carbon atoms and the n-alkyl group in the alkylaniline group has 1 –12 carbon atoms and mixtures thereof, and wherein said cholesteric liquid crystal is selected from the group consisting of cholesteryl halides, cholesteryl esters of organic acids and mixtures thereof.

6. A liquid crystal composition as claimed in claim 5, wherein said p-alkoxybenzylidene-p-n-alkylaniline is selected from the group consisting of p-methoxybenzylidene-p-n- butylaniline, p-ethoxybenzylidene-p-n-butylaniline, p-propoxybenzylidene-p-n-octylaniline, p-methoxybenzylidene-p-n-hexylaniline and p-methoxybenzylidene-p-n-octylaniline.

7. A liquid crystal composition as claimed in claim 5, wherein said cholesteryl halide is selected from the group consisting of cholesteryl chloride and cholesteryl bromide.

8. A liquid crystal composition as claimed in claim 5, wherein said cholesteryl ester is selected from the group consisting of cholesteryl nonanoate and cholesteryl benzoate.

9. A liquid crystal composition as claimed in claim 1, wherein said quinoneimine compound of said first organic cyclic compound group is selected from the group consisting of 6-amino-2-methylbenzoquinone-(1)-imine-(4) and 2,5-diamino-naphthoquinone-(1)-imine-(4).

10. A liquid crystal composition as claimed in claim 1, wherein said organocyclic imino compound of said first organic cyclic compound group is 3-amino-1,1-dimethylcyclohexene-(3)-imine-(5).

11. A liquid crystal composition as claimed in claim 1, wherein said first organic cyclic compound is mixed in an equal amount by mole with said second organic cyclic compound.

* * * * *